May 20, 1969 J. G. WARD 3,444,629

COMPARATIVE SHOCK-ABSORBER DEMONSTRATION STAND

Filed Jan. 5, 1967

INVENTOR.
JOHN G. WARD
BY
Robert W. Beach
ATTORNEY

United States Patent Office 3,444,629
Patented May 20, 1969

3,444,629
COMPARATIVE SHOCK-ABSORBER
DEMONSTRATION STAND
John G. Ward, Portland, Oreg., assignor, by mesne assignments, to Monroe Auto Equipment Company, Monroe, Mich.
Filed Jan. 5, 1967, Ser. No. 607,514
Int. Cl. G09b 25/00; G01m 17/04
U.S. Cl. 35—50                                                11 Claims

ABSTRACT OF THE DISCLOSURE

This invention relates to a demonstration stand on which an effective automotive shock absorber and a comparatively ineffective automotive shock absorber can be mounted, preferably in side-by-side relationship, and arranged so that each shock absorber can be contracted manually at will and, when released, will be extended by spring action, the effective shock absorber being extended comparatively gradually, and the relatively ineffective shock absorber being extended comparatively abruptly.

---

The comparative shock-absorber testing stand of the present invention constitutes an improvement on the shock absorber performance demonstration stand of United States patent application Ser. No. 596,564 of Loyd McAfee, filed Nov. 23, 1966.

The purpose of an automotive shock absorber is to snub the action of suspension springing for an automobile so that the rebound, in particular, of a wheel after it passes over a bump will be damped. In other words, the shock absorber provides a dashpot action if it is in good operating condition. It is desirable to be able to demonstrate to a prospective customer the manner in which a shock absorber performs and the difference in the performance between a shock absorber which is effective because it is in good condition and one which is relatively ineffective because its parts are worn.

It is the principal object of the present invention to provide a demonstration stand which will simulate the actual operation of a shock absorber so that it can be seen readily by a prospective customer. In simulating the operation of the shock absorber it is an object to portray graphically the difference in operation between a shock absorber in good condition and one which is in poor condition by reference to the speed of movement and smoothness of operation of the shock absorber action.

A further object is to enable the performance of a shock absorber in good condition and the performance of a shock absorber in poor condition to be compared directly and either sequentially or simultaneously, as may be preferred.

More specifically, it is an object to mount an effective shock absorber and a comparatively ineffective shock absorber in side-by-side relationship, so as to facilitate visual comparison of their operation.

The foregoing objects can be accomplished by providing a double shock absorber performance demonstration stand composed of a frame which can be stably supported upon the ground, and on which can be mounted two spring-actuated members in side-by-side relationship, movement of which can be damped respectively by two shock absorbers whose effectiveness is to be compared. Each such member may be a lever arm pivoted on the stand and engageable by a shock absorber, and each lever can be swung manually in one direction in opposition to the force of a spring for contracting a shock absorber, and then such lever is released for movement in the opposite direction by the spring under the control of one or the other shock absorber. Thus, the same spring can be used to move either lever and the shock absorber attached to such lever.

Figure 1:
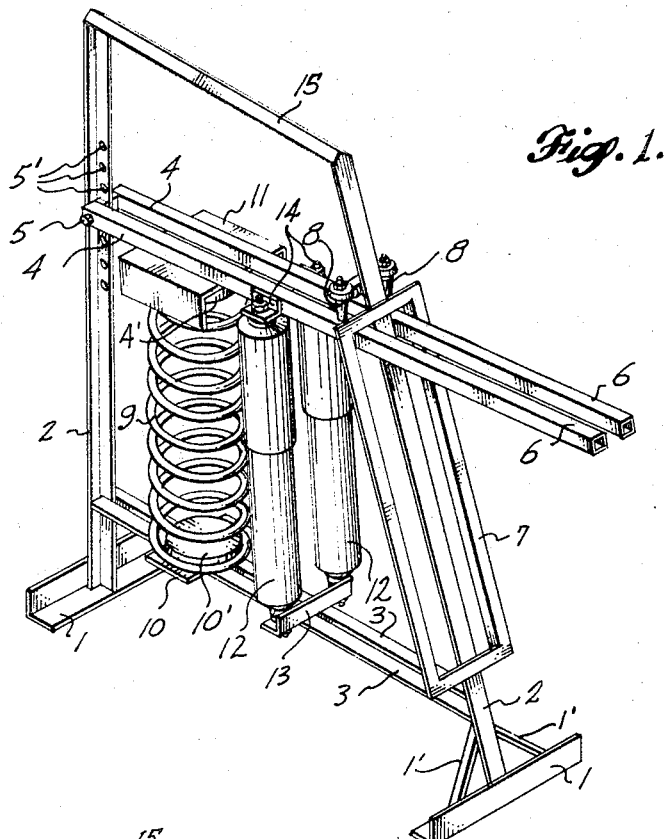
Figure 2:
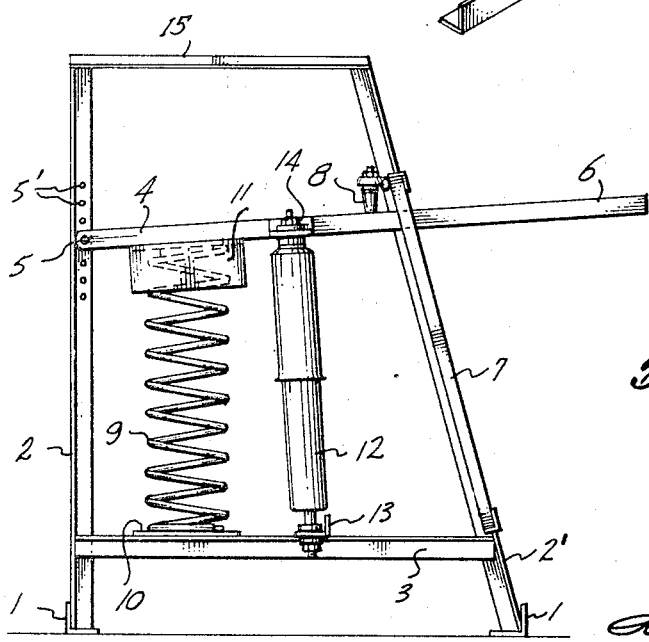

FIGURE 1 is a top perspective of a representative type of comparative shock absorber performance demonstration stand, and FIGURE 2 is a side elevation of such stand.

An automobile shock absorber is installed on an automobile in conjunction with a spring for the purpose of modifying the action of the spring, both during its movement under a sudden load applied to an automobile wheel and during opposite movement of the spring-pressed member to its initial condition. Frequently the spring is of the helical compression type and the shock absorber is of the barrel type composed of telescoping members which provide a dashpot action to modify the spring movement. In providing the performance demonstration stand of the present invention for shock absorbers the usual relationship and environment of a typical compression spring and shock absorber combination has been employed. These elements have been mounted in a relationship generally comparable to that which these elements occupy in an automobile, yet are positioned so that a prospective shock absorber customer can observe the performance of the spring and shock absorber readily during the demonstration and can actually manipulate the device himself to operate the spring and shock absorber.

A particular feature of the present invention is the disposition of a relatively effective shock absorber and a relatively ineffective shock absorber in side-by-side relationship, either of which can be extended from a contracted position by the same helical compression spring. Because the same spring effects extension of either of the shock absorbers, the prospective customer is assured that the same spring force is being applied to each shock absorber, assuming that the levers engaged by the shock absorbers have substantially equal freedom of movement and the levers are displaced corresponding distances in the demonstrations of the two shock absorbers.

While various types of structural shapes could be used for construction of the demonstration stand, the stand shown in the drawings is fabricated from band-type members and, in particular, from angle shapes and T bar shapes. Thus, the stand shown in FIGURES 1 and 2 includes parallel ground-engaging members 1 which, in this instance, are angles. Posts 2 and 2' project upwardly from these angles. These posts are T bars, and post 2 is disposed with its cross flange in face-to-face contact with an upright flange of a ground-engaging member over a substantial area. These two elements can be welded together by fillet welds to hold such post in vertical position.

The other post 2' is shown as being inclined upwardly from its ground-engaging member 1 toward the vertical post 2 so as to increase the stability of the stand. Because of such inclined relationship between the transverse flange of the T bar member and the upright flange of the ground-engaging angle, such T bar flange and the angle flange are not in face-to-face contact. Consequently, the post can be connected to the ground-engaging angle by inclined braces 1'.

The lower portions of the posts 2 and 2' are connected by parallel mounting rails 3 of angle cross section. The upright flanges of these angles are arranged back-to-back and engage opposite sides of the stem flanges of the posts 2 and 2' to which they can be welded. Such mounting rails serve the double purpose of tying together the posts 2 and 2' and of providing a mounting for the shock absorbers and spring.

Above the mounting rails 3 are two levers 4 having corresponding ends pivotally connected to the post 2 by pivot pin or bolt 5. Such levers preferably are of square tubular section, and portions of such levers remote from the pivot pin or bolt 5 extend along opposite sides, respectively, of the inclined post 2'. The swinging ends of these levers form handle portions 6. Guide bars 7, mounted on opposite sides of the inclined post 2', are spaced from such post so that each lever is swingable in the space between such post and a guide bar. Several apertures 5' can be provided in vertically spaced arrangement in the stem flange of the post 2, if desired, through any one of which the pivot pin 5 can be projected to raise or lower the pivoted ends of the levers 4 as may be desired.

Upward movement of the levers 4 can be limited by engagement of their swinging ends with stops or bumpers 8, mounted respectively on the inclined post 2' in positions above the corresponding levers 6. The levers are swung upward about their pivot 5 by a single helical compression spring 9 which is interengaged between the mounting rails 3 and the levers 4. The lower end of such spring bears on a spring perch 10 mounted on the rails 3. Displacement of the lower end of such spring from the perch 10 is prevented by engagement of the lower end of the spring with a retaining block secured on such perch in a position upstanding therefrom, and fitted reasonably closely in the lower end of the spring 9.

The upper end of the helical compression spring 9 transmits the spring force to the levers 4 such as by its upper end bearing on a spring perch engageable with either of the levers 4. This upper spring perch is shown as a channel member 11 having down-turned flanges disposed along opposite sides of the spring's upper end. The spring upper end is retained relative to the lower face of the channel web by a block 11' welded to the channel web and fitting within the convolutions of the spring.

The spring 9 is analogous to an automobile suspension spring and the shock absorbers 12 preferably are mounted alongside the spring between the mounting rails 3 and the respective levers 4. Mounting of the spring and shock absorbers in adjacent relationship enables the rebound action to be observed easily by a prospective customer, yet they will be generally in the relationship in which they are arranged in an actual automobile installation. The lower ends of the barrel-type shock absorbers 12 are mounted on opposite end portions of a bracket 13 having its length extending transversely of the lengths of the mounting rails 3. The upper ends of these shock absorbers may have bolts on them, which extend through apertures in mounting brackets 14 secured to the levers 4, respectively. The shock absorbers can then be secured in place by nuts screwed on to the bolts in the upper ends of the shock absorbers so that it is merely necessary to unscrew such nuts and contract the shock absorbers in order to remove them from the stand.

The spring-engaging channel 11 is not secured to either of the levers 4, but bears against both of them when the spring 9 is extended. When either lever 4 is swung downward about its pivot 5 by pressure being exerted on the corresponding handle 6, the downwardly moving lever will compress the channel 11 downward to withdraw it from engagement with the other lever and contract the spring. In such case, there is sufficient resistance to movement of the shock absorber 12 connected to the other lever to maintain it in its upper position despite removal of the lifting force of spring 9 on it.

If the handle 6 of the depressed lever is then released suddenly, the spring will tend to swing upward again the lever which has been depressed. The shock absorber 12 connected to such lever must expand conjointly with the expansion of the spring, and consequently, the rate of return movement of the lever which is effected by the force produced by the compressed spring 9 will be regulated by the amount of resistance to movement of the lever produced by the shock absorber connected to it. If the shock absorber is in good condition, so that its snubbing action is effective, the movement of the lever produced by the spring will be smooth and at a substantially uniform rate. If, however, the shock absorber is relatively ineffective, the spring will swing the lever upward much more rapidly and with an accelerating movement. If a shock absorber 12 is in such poor condition that it has virtually no snubbing action, the spring 9 will fling the lever upward abruptly so that it will strike the bumper 8 forcibly in impressive visual contrast to the slow and steady movement of the lever controlled by a shock absorber in good condition.

The violence of movement of the lever will, of course, be governed not only by the effectiveness of the shock absorber, but also by the extent to which the lever is displaced downward before it is released. Also, the abruptness of lever movement will depend upon the strength of spring 9, its length, and the position in which the pivot 5 is mounted on the post 2. Because the spring 9 may move one of the levers 4 quite vigorously, it is preferred that the upper ends of the posts 2 and 2' be connected by a tie member 15 as shown.

I claim as my invention:

1. In an apparatus for comparing the snubbing performance of two or more shock absorbers or like devices,
   means defining a support structure including an upright member and a generally horizontal support member,
   first and second manually engageable lever arms on said support structure and movable independently between actuated and deactuated positions,
   spring means for resiliently urging said lever arms toward said deactuated positions, and
   means including said support structure for mounting first and second shock absorbers, whereby each of the shock absorbers is independently compressed when the associated of said lever arms is biased from its deactuated position to its actuated position and the shock absorbers will exhibit their respective snubbing action in resisting movement of said lever arms as the same are urged toward said deactuated positions by said spring means.

2. A shock absorber demonstration stand for comparing the snubbing action of two or more shock absorbers, comprising a frame, a plurality of lever arms having swingable ends and pivotally connected to said frame at locations spaced from their swingable ends, said lever arms normally being disposed in generally horizontal positions and adapted to have swingable ends thereof pivot downwardly from said horizontal positions, spring means engaged between said frame and said lever arms and urging the swingable ends of each of said lever arms to swing toward said horizontal positions upon depressing said swingable ends of said lever arms, and means for mounting at least two rebound-snubbing shock absorbers at positions between said frame and said lever arms, said mounting means comprising means for mounting the lower end of each of the shock absorbers on said frame and for mounting the upper ends of each of the shock absorbers to respective ones of said plurality of lever arms, whereby each of the shock absorbers may be independently compressed when its associated lever arm is pivoted downwardly and the relative snubbing action of the shock absorbers can be compared as said lever arms are biased toward said horizontal positions by said spring means.

3. The shock absorber demonstration stand defined in claim 1, and spring-seat means carried by the spring means and engageable selectively with each of the two lever arms.

4. The shock absorber demonstration stand defined in claim 3, in which the spring means includes a helical compression spring, and the spring-seat means is carried by one end of said spring.

5. The shock absorber demonstration stand defined in claim 1, which includes an upright post disposed between the two lever arms and guide means carried by said post and guiding movement of the two lever arms along opposite sides of said post, respectively.

6. The shock absorber demonstration stand defined in claim 2, in which the lever arms are disposable in side-by-side relationship with their lengths extending generally horizontal, the shock absorbers are of the barrel type, and means mounting the shock absorbers in side-by-side relationship with corresponding ends of such shock absorbers engaged respectively with the two lever arms.

7. The shock absorber demonstration stand defined in claim 6, in which the spring means includes a helical compression spring, and means mounting said spring in a position with its length generally parallel to the lengths of the shock absorbers for applying pressure to portions of the lever arms between the shock absorbers and the pivotal connections of the lever arms to the frame.

8. The shock absorber demonstration stand defined in claim 2, in which the frame includes two upright posts disposed in spaced relationship and means connecting said posts for supporting the spring means and the shock absorber.

9. The shock absorber demonstration stand defined in claim 8, in which the lever arms are pivotally connected to one of the posts, the other post is inclined upwardly toward the first post, and tie means connecting the upper portions of said posts.

10. The shock absorber demonstration stand defined in claim 9, in which the two lever arms are pivotally connected to one post in side-by-side relationship with their lengths extending generally horizontal, the shock absorbers are of the barrel type, are disposed in side-by-side relationship with their lengths upright and have their upper ends engaged respectively with the two lever arms, the spring is a helical compression spring disposed with its length upright, and spring-seat means carried by the upper end of said spring and engageable selectively with each of the two lever arms at locations between the shock absorbers and the pivotal connections of the lever arms to the post.

11. In the method of comparing the performance characteristics of two or more telescopic shock absorbers in an apparatus including a frame, a plurality of independently pivotable lever arms having swingable ends and pivoted to the frame at locations spaced from their swingable ends, and resilient spring means engaged between the frame and the lever arms and resisting movement of said lever arms from deactuated positions to actuated positions, the steps which include, supporting the shock absorbers in a preselected test position by securing one end thereof to the frame and the opposite end thereof to the associated of said lever arms, independently biasing the swingable ends of said lever arms from said deactuated positions toward said actuated positions against the resistance of said resilient spring means and thereby independently compressing the associated of the shock absorbers, independently releasing said swingable ends of said lever arms and thereby permitting said arms to be biased toward said deactuated positions under the influence of said resilient spring means, using the shock absorbers to snub said movement of said lever arms toward said deactuated positions, and comparing the rate of movement of said lever arms from said actuated positions to said deactuated positions to determine the relative snubbing performance characteristics of said shock absorbers.

References Cited

UNITED STATES PATENTS

| 2,746,764 | 5/1956 | Davis | 280—124 |
| 3,193,303 | 7/1965 | Allison et al. | 280—124 |
| 3,366,400 | 1/1968 | Fitch | 280—124 |

FOREIGN PATENTS

| 861,127 | 2/1961 | Great Britain. |

EUGENE R. CAPOZIO, *Primary Examiner.*

H. S. SKOGQUIST, *Assistant Examiner.*

U.S. Cl. X.R.

73—11